United States Patent
Knutson et al.

(10) Patent No.: US 6,658,242 B1
(45) Date of Patent: Dec. 2, 2003

(54) TDMA WIRELESS TELEPHONE SYSTEM WITH INDEPENDENTLY TRACKED DEMODULATION PARAMETERS

(75) Inventors: Paul Gothard Knutson, Indianapolis, IN (US); Kumar Ramaswamy, Indianapolis, IN (US); Dong-Chang Shiue, Carmel, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/581,270

(22) PCT Filed: Sep. 1, 1998

(86) PCT No.: PCT/US98/18089

§ 371 (c)(1),
(2), (4) Date: Nov. 9, 2000

(87) PCT Pub. No.: WO99/31837

PCT Pub. Date: Jun. 24, 1999

Related U.S. Application Data

(60) Provisional application No. 60/069,345, filed on Dec. 12, 1997.

(51) Int. Cl.$^7$ .................................................. H04Q 7/00
(52) U.S. Cl. ..................... 455/232.1; 455/230; 455/130; 370/314
(58) Field of Search ............................... 455/13.2, 130, 455/67.16, 257, 208, 265, 502, 255, 503, 232.2, 230, 136, 133, 239.1, 240.1, 243.1, 245.1, 247.1, 248.1; 320/314, 321, 347, 337, 442; 325/142, 147, 150, 219

(56) References Cited

U.S. PATENT DOCUMENTS

| | | | | |
|---|---|---|---|---|
| 5,375,140 A | * | 12/1994 | Bustamante et al. | 375/142 |
| 5,583,062 A | * | 12/1996 | Kapoor | 438/451 |
| 5,751,766 A | * | 5/1998 | Kletsky et al. | 375/224 |
| 6,160,443 A | * | 12/2000 | Maalej et al. | 329/304 |
| 6,278,754 B1 | * | 8/2001 | Thomas et al. | 375/360 |
| 6,359,944 B1 | * | 3/2002 | Curtis et al. | 375/344 |
| 6,363,124 B1 | * | 3/2002 | Cochran | 375/326 |
| 6,370,182 B2 | * | 4/2002 | Bierly et al. | 375/140 |
| 6,434,365 B1 | * | 8/2002 | Knutson et al. | 455/69 |
| 6,456,648 B1 | * | 9/2002 | Bultan et al. | 375/148 |
| 6,470,005 B1 | * | 10/2002 | Knutson et al. | 370/347 |
| 6,577,685 B1 | * | 6/2003 | Bao et al. | 375/327 |
| 6,590,872 B1 | * | 7/2003 | Shiue et al. | 370/314 |

FOREIGN PATENT DOCUMENTS

| | | | | |
|---|---|---|---|---|
| EP | 0639914 A2 | * | 5/1994 | H04L/27/22 |
| WO | 88/05981 | | 8/1988 | H04J/3/06 |
| WO | 96/08905 | | 3/1996 | H04L/25/03 |
| WO | 96/34481 | | 10/1996 | H04L/25/03 |
| WO | 97/13388 | | 4/1997 | H04Q/7/38 |

* cited by examiner

*Primary Examiner*—Pablo N Tran
(74) *Attorney, Agent, or Firm*—Joseph S. Tripoli; Harvey D. Fried; Joseph J. Kolodka

(57) ABSTRACT

A wireless telephone system comprises a base transceiver having a base receiver and a plurality of wireless handsets. Each handset comprises a handset transceiver for establishing a time-division multiple access (TDMA) link over a shared channel with the base unit via the base transceiver, in which each handset communicates during an exclusive time slot of a TDMA scheme that allocates time slots to handsets. The base receiver is characterized by a plurality of demodulation parameters and is for synchronizing with each handsets. The base receiver stores a set of demodulation parameters for each handset and switches to the set of demodulation parameters for a particular handset when the base unit is to synchronize with the particular handset.

11 Claims, 6 Drawing Sheets

TDMA WIRELESS TELEPHONE SYSTEM WITH INDEPENDENTLY TRACKED DEMODULATION PARAMETERS

This application claims the benefit of provisional application No. 60/069,345, filed Dec. 12, 1997.

BACKGROUND OF THE INVENTION

1. Field of the Invention

The present invention relates to multi-line wireless telephone systems and, in particular, to receiver subsystems in such systems designed to synchronize when communicating between transceivers of the system.

2. Description of the Related Art

The use of telephones and telephone systems, including wireless telephone systems, is widespread. In wireless telephone systems, such as digital 900 MHz systems, a cordless or wireless telephone handset unit communicates via either analog or digital radio signals with a base unit, which is typically connected via a standard telephone line to an external telephone network. In this manner, a user may employ the wireless handset to engage in a telephone call with another user through the base unit and the telephone network.

Multi-line wireless telephone systems are also in use in various situations, such as businesses with many telephone users. Such systems employ a handset that communicates with up to N handsets simultaneously, typically with digital communications schemes, such as time division multiple access (TDMA). It is desirable to implement the features of current private branch exchange (PBX) systems in a multi-line wireless telephone system.

Wireless telephone systems, such as digital 900 MHz systems, are typically used to establish a wireless network between the base unit and several handsets. The base station transceiver must synchronize with each active handset. This synchronization can require different demodulation and related parameters for each handset, since some handsets may be closer to the base station than others, giving rise to a large dynamic range difference between each handset-base station pair. For example, since the handsets and base station have independent local oscillators for frequency references, and signal strengths, there will be carrier offsets and other demodulation parameters unique to each handset to station link. In addition, the system may be located in an indoor office environment, giving rise to unique multipath problems for each handset-base station link which need to be addressed differently for each handset-base unit pair.

One way to address this problem is to use an independent link for each handset. However, this approach is not without its own problems. For example, with over 100 dB differences between close and far signals, it is difficult to use FDMA (frequency division multiple access) techniques to establish the independent links. Similarly, CDMA (code division multiple access) methods require extremely tight power controls and/or many chips per symbol.

A time-division system like TDMA is often used in multi-line wireless phone systems. In such a system, a single RF channel is used, and each handset transmits and receives data during a dedicated time slice within an overall cycle or epoch. In such a system, however, it can be difficult for the base unit to adequately synchronize with each handset at the beginning of its respective time slice, since each operates on a link having potentially different characteristics than those of the other handsets. One possible solution is to use an extremely fast receiver that is able to re-synchronize at the beginning of each time slice, even if each time slice corresponds to a handset having a link with different characteristics than the last. This solution, however, requires a very fast receiver, with its attendant cost and complexity, and is not always the most efficient way to synchronize links.

Previous TDMA communications systems are described in PCT Application No. WO 96/34481 (Ionica International Limited), published Oct. 31, 1996, and PCT Application No. WO 97/13388 (Telefonaktiebolaget), published Apr. 10, 1997. The Ionica reference describes a telephone system which synchronizes with a unit in accordance with various demodulation parameters, and the Telefonaktiebolaget reference describes various aspects of modulation and time slot allocation in a TDMA type cellular telecommunication system.

SUMMARY

A wireless telephone system comprises a base transceiver having a base receiver and a plurality of wireless handsets. Each handset comprises a handset transceiver for establishing a time-division multiple access (TDMA) link over a shared channel with the base unit via the base transceiver, in which each handset communicates during an exclusive time slice of a TDMA scheme that allocates time slices to handsets. The base receiver is characterized by a plurality of demodulation parameters and is for synchronizing with each handsets. The base receiver stores a set of demodulation parameters for each handset and switches to the set of demodulation parameters for a particular handset when the base unit is to synchronize with the particular handset.

DESCRIPTION OF THE PREFERRED EMBODIMENT

Figure 1:
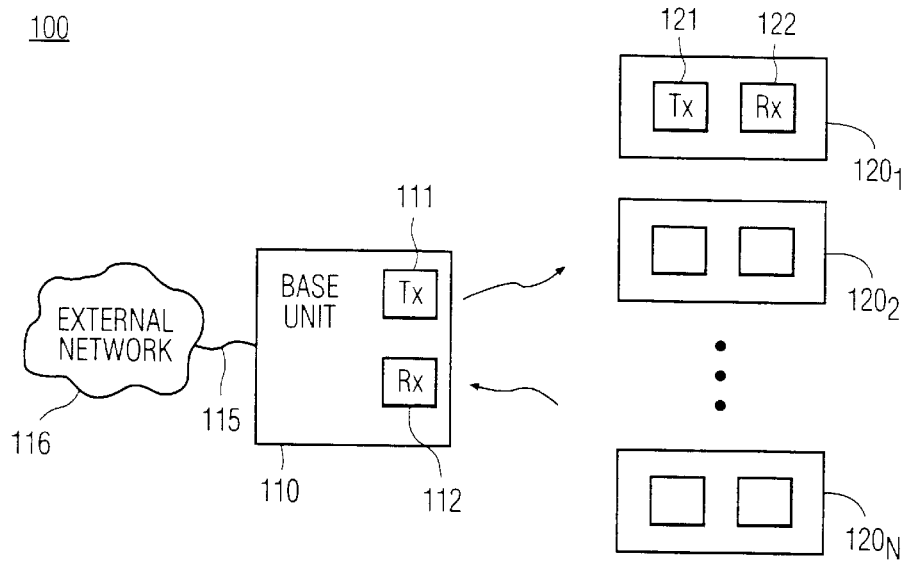
FIG. 1 is a block diagram of TDMA multi-line digital wireless telephone system, in accordance with an embodiment of the present invention.

Referring now to FIG. 1, there is shown a block diagram of spread spectrum TDMA multi-line digital wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. System 100 also comprises N wireless handsets $120_1$, $120_2$, ... $120_N$. Each has a transmitter and receiver unit (transceiver), such as transmitter 121 and receiver 122 of handset $120_1$. In one embodiment, receiver unit 112 comprises N separate receivers, and transmitter unit 111 comprises N separate transmitters, so that receiver and transmitter units 112 and 111 provide N total transceiver units, one for each of N wireless handsets. At any given time, M handsets ($0 \leq M \leq N$) are operating or active (i.e., in the process of conducting a telephone call). In one embodiment, system 100 employs a digital TDMA scheme, in which each operating handset only transmits or receives data during its own "time slice" or slot. System 100 thus provides a wireless network between the base station 110 and each handset $120_i$ ($1 \leq i \leq N$).

System 100 preferably employs block error coding to reduce error. In one embodiment, during a time slice, digitally compressed audio packets (such as ADPCM (adaptive differential pulse code modulation) samples) are transmitted, such as recommendation ITU-T G.721 or G.727 with a block code. This allows, for example, 16 ADPCM samples to be transmitted per audio packet. Block codes and ADPCM are preferred because of their low latency, which allows the wireless phone behavior to mimic that of a standard corded phone. Channel codes such as convolutional codes or turbo codes, or stronger source coding such as LPC (linear predictive coding), transform coding, or formant coding incur more delay, which makes the system less like the equivalent corded telephone.

In order to address the aforementioned problems, the present invention employs a demodulator architecture in the base unit receiver, which independently tracks and updates demodulation parameters for each of the plurality of active links supported by the TDMA wireless network, as described in further detail hereinbelow with reference to FIGS. 3–8. The various receiver parameters that are adjusted in order to enable adequate or quicker acquisition and synchronization of a given link are referred to herein as demodulation parameters.

Figure 2:
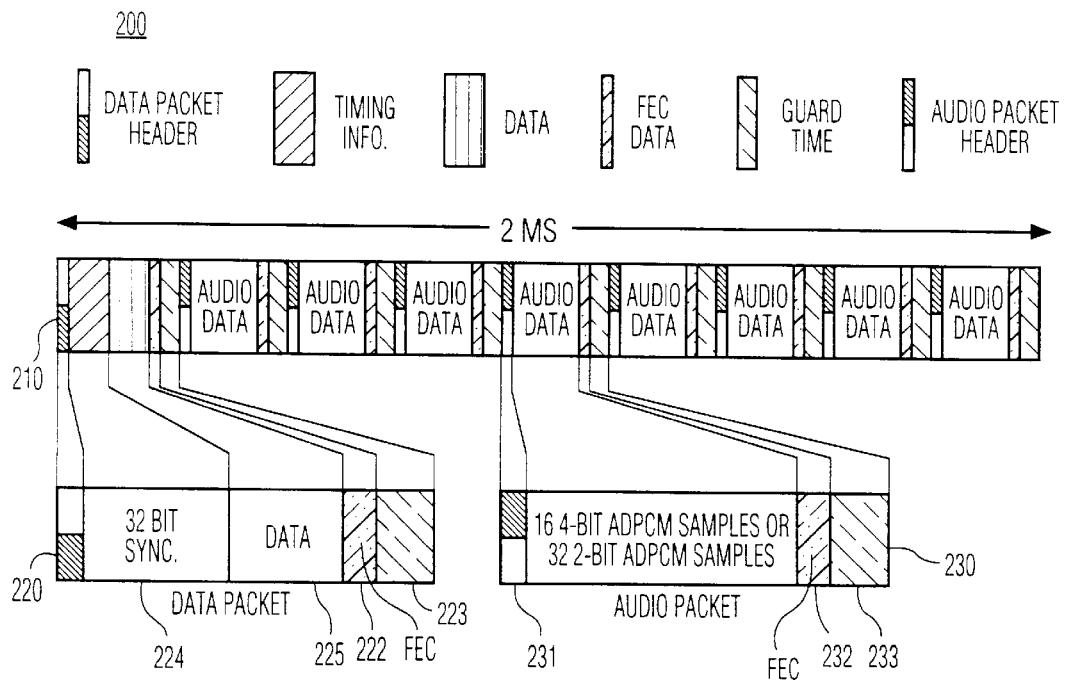
FIG. 2 is a schematic representation of the field, data packet, and audio packet structures used in the TDMA scheme of the system of FIG. 1.

Referring now to FIG. 2, there is shown a schematic representation 200 of the field, data packet, and audio packet structures used in the TDMA scheme of TDMA system 100 of FIG. 1. In one embodiment, a 2 ms field 210 of digital data comprises nine total packets, viz. a data packet 220 and eight audio packets such as audio packet 230. Each data packet is a set of data transmitted either to a given handset from the base unit or vice-versa, during a discrete time slice during which time no other handsets receive or transmit data over the system=s data channel. Each audio packet is a set of audio data transmitted either to a given handset from the base unit or vice-versa, during a given time-slice in an overall Aepoch=scheme, again during which time no other handsets receive or transmit data over the system=s data channel.

As illustrated, each type of packet contains various subfields or sections. For example, data packet 220 comprises a 32-bit sync field 222, a data field 225, a FEC (forward error correction) field 222, and guard time 223. The data in data packet 220 is used to communicate between the base unit and a particular handset, and contains various types of information, such as caller ID type information, range and power information, and the like.

Audio packet 230 comprises an audio packet header 231, FEC data section 232, and guard time 233. Audio packet header 231, for example, contains information identifying the audio packet (such as the handset), the current place in the epoch, and the like.

In one mode of operation, each handset receives 16 4-bit ADPCM (adaptive differential pulse code modulation) samples during each time slice of the epoch allocated for the handset to receive audio data; and transmits to the base unit 16 ADPCM samples during each time slice of the epoch allocated for the handset to transmit audio data. In another mode of operation, the number of samples may be doubled to 32 per time slice, by lowering each sample=s quality to 2-bit samples.

Audio packet 230 therefore also comprises a main 64-bit Aaudio data=portion, which comprises either 16 4-bit ADPCM samples (high quality), or 32 2-bit ADPCM samples (low quality). As will be appreciated, for a 2 ms field, high quality (16 4-bit ADPCM samples per audio packet or time slice) provides 32 Kbps ADPCM (the default audio data), and low quality (32 2-bit samples shared between two handsets, per audio packet) provides 16 Kbps.

The present invention utilizes independent automatic gain control (AGC), carrier tracking loops (CTL), and equalizer loops for each link, to independently track demodulation parameters and states associated with these three loops or blocks. The states and parameters associated with these three loops and which are adjusted to improve or allow synchronization are referred to herein, in general, as demodulation parameters. Since each handset is independently moving and is in a potentially unique position, different parameters are needed by the base unit 110 to synchronize with each handset at the beginning of the time slice for that handset. If these parameters and states (described in further detail below) were to be stored and modified during communication with each handset, then once synchronization is first established and a workable first set of parameters and states is found that allows synchronization, then these parameters may be used as a starting point for the next time the handset link is established. However, the last set of parameters established for one handset link will usually not be an efficient starting point for trying to synchronize with a different handset.

Accordingly, in the present invention, the AGC, CTL, and equalization blocks within the demodulation/receiver portion of base unit 110 are modified so allow each block to store and track a set of parameters for each handset, and to use the last-modified set of parameters for a given handset at the next time slice requiring re-synchronization with that handset. For example, once the appropriate AGC, CTL, and equalization parameters are found to allow synchronization with handset #1, they are stored in the respective blocks when handset #1's time slice is completed. When handset #2's time slice is next, base unit 110 again synchronizes and stores these parameters in a different location for handset #2. When another handset #1 time slice occurs, base unit 110's receiver re-loads with the last-stored parameters defining the state of the demodulation parameters during the last communication with handset #1, and updates these parameters as necessary. However, comparatively quick synchronization should be achieved since the demodulation parameters used in the previous time slice for handset #1 will likely be close to the ones needed for synchronization, since handset #1 will have only moved slightly in the brief time (e.g., 2 ms) between its time slices. Thus, the present invention minimizes acquisition and synchronization time for each time slice. The present invention also allows a single receiver datapath to be used to support TDMA signals from multiple independent sources.

The three receiver or demodulator blocks AGC, CTL, and equalization, of base unit 110's receiver, are modified as described below to allow each to provide state and parameter storage for each handset. In a preferred embodiment, the present invention is implemented in a digital system in which the state of the three loops or blocks exist in the digital domain. In an alternative embodiment, some analog domains are utilized, although it may be more difficult to store a loop state in the analog domain (for example, it may be difficult to hold a voltage controlled oscillator (VCO) for carrier tracking over the time between TDMA slices). Therefore, in a preferred embodiment, the present invention is implemented digitally.

Figure 4:
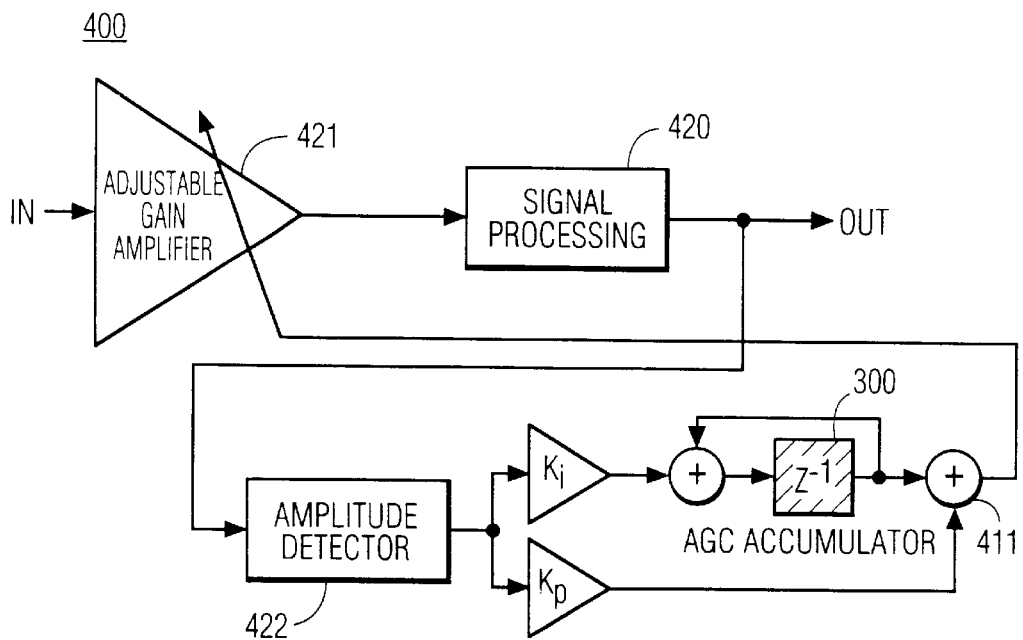
FIG. 4 is a block diagram of an AGC block used in the base unit of FIG. 1 and incorporating the AGC integrator of FIG. 3.

Referring now to FIG. 4, there is shown an AGC block 400 used in receiver 112 of base unit 110 of FIG. 1. AGC block 400 comprises a plurality of standard components, except that AGC accumulator 300 comprises a plurality of registers, one for each handset (or possible link) of system 100. Signal processing block 420 is any receiver processing which occurs between the adjustable gain amplifier 421 and the input to amplitude detector 422, such as a pulse shaping filter, carrier derotator, analog-to-digital converters (ADC), IF amplifiers, and the like. AGC integrator 300 stores a plurality of AGC parameters, to store the AGC loop state independently for each link.

Figure 3:
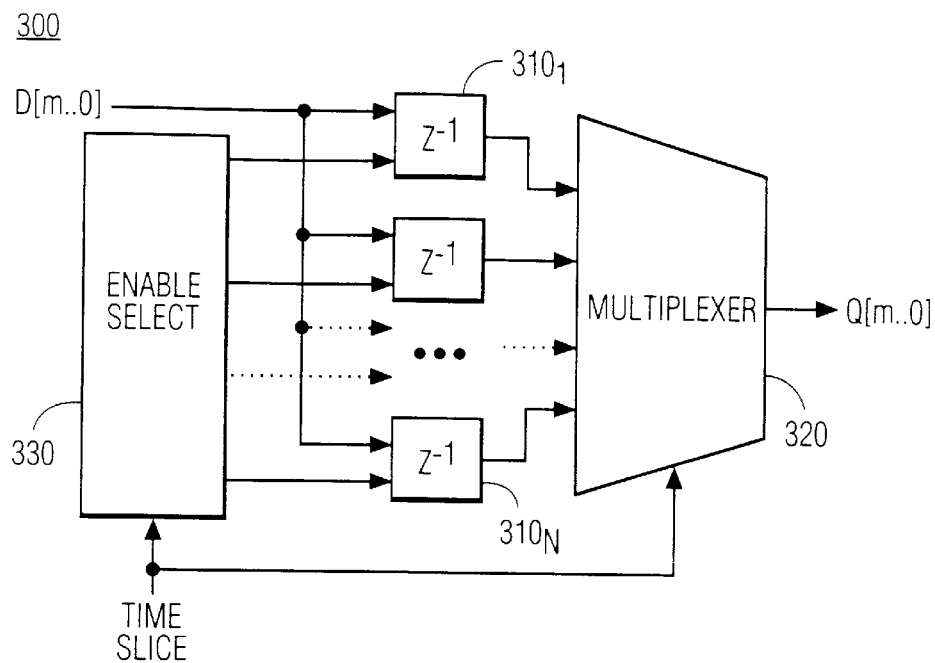
FIG. 3 is a block diagram of an automatic gain control (AGC) integrator with a plurality of registers, in accordance with an embodiment of the present invention.

Referring now to FIG. 3, there is shown in further detail the AGC integrator or accumulator 300 of AGC block 400, having a plurality of N registers $310_i$. AGC is implemented by storing an AGC value for each time slice or link, and by allowing each AGC value to adapt or update only during its designated time slice. In the TDMA wireless phone system 100 of the present invention, there is sufficient guard time (see guard time 223, FIG. 2) to allow the amplifiers to slew 100 dB in the dead time between TDMA time slices. One AGC state parameter is used per time slice, and is provided from AGC integrator 300.

For each time slice, one of the registers $310_i$ is enabled and its output is selected, by applying information concerning the current time slice to enable select 330 and multiplexer 320. This causes the appropriate output value Q to be applied to summing node 411. Since only the appropriate register $310_i$ is enabled, only this register is updated with input value D; the other registers are held at their previous value. This allows each channel of the receiver to start where it left off when its time slice occurs, since the disabled registers cause the loop to behave as if it were in perfect lock (amplitude error is zero). As will be appreciated, this is likely to be a better starting point for the next burst of data from the same transmitter receiver pair (handset-base unit pair) than default initial conditions or where the previous transmitter receiver pair left off would be.

Figure 5:
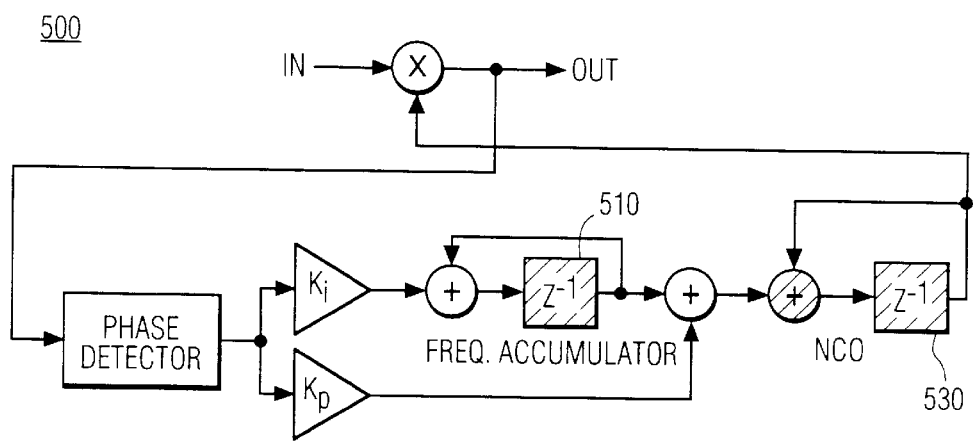
FIG. 5 is a block diagram of a carrier tracking loop (CTL) block used in the base unit of FIG. 1.

Referring now to FIG. 5, there is shown a CTL block 500 used in receiver 112 of base unit 110 of FIG. 1. CTL block 500 comprises a plurality of standard components, except that frequency accumulator 510 and numerically controlled oscillator (NCO) 530 are able to store a plurality of CTL-related states, one for each handset (or possible link) of system 100, as described in more detail with reference to FIGS. 6 and 7.

To implement carrier tracking, NCO 530 is employed, and is kept operating for each time slice which is driven by value of frequency integrator or accumulator 510. Alternatively, the value applied to NCC integrator 530 can be computed by multiplying the value of frequency integrator 510 times the number of clock cycles until the next time slice. In both cases, the present invention only updates CTL states during the appropriate time slice.

CTL 500 provides a second order CTL, which utilizes two state parameters per time slice, the frequency and NCO parameters, stored by frequency integrator 510 and NCO integrator 530, respectively. The NCO parameter can be computed from its initial value and the value in the frequency integrator as follows:

$$NCO_{i+d} = NCO_i + d \cdot F \quad (1)$$

where $NCO_i$ is the ith value of the NCO integrator, d is the number of delays until this time slice is active, and F is the frequency integrator value. This value is constant since the integrator only updates during the time slice. This allows a common NCO and CTL loop filter to support all TDMA slices. Only two data are required for CTL state preservation, the frequency integrator and the NCO integrator parameters or values.

Figure 6:
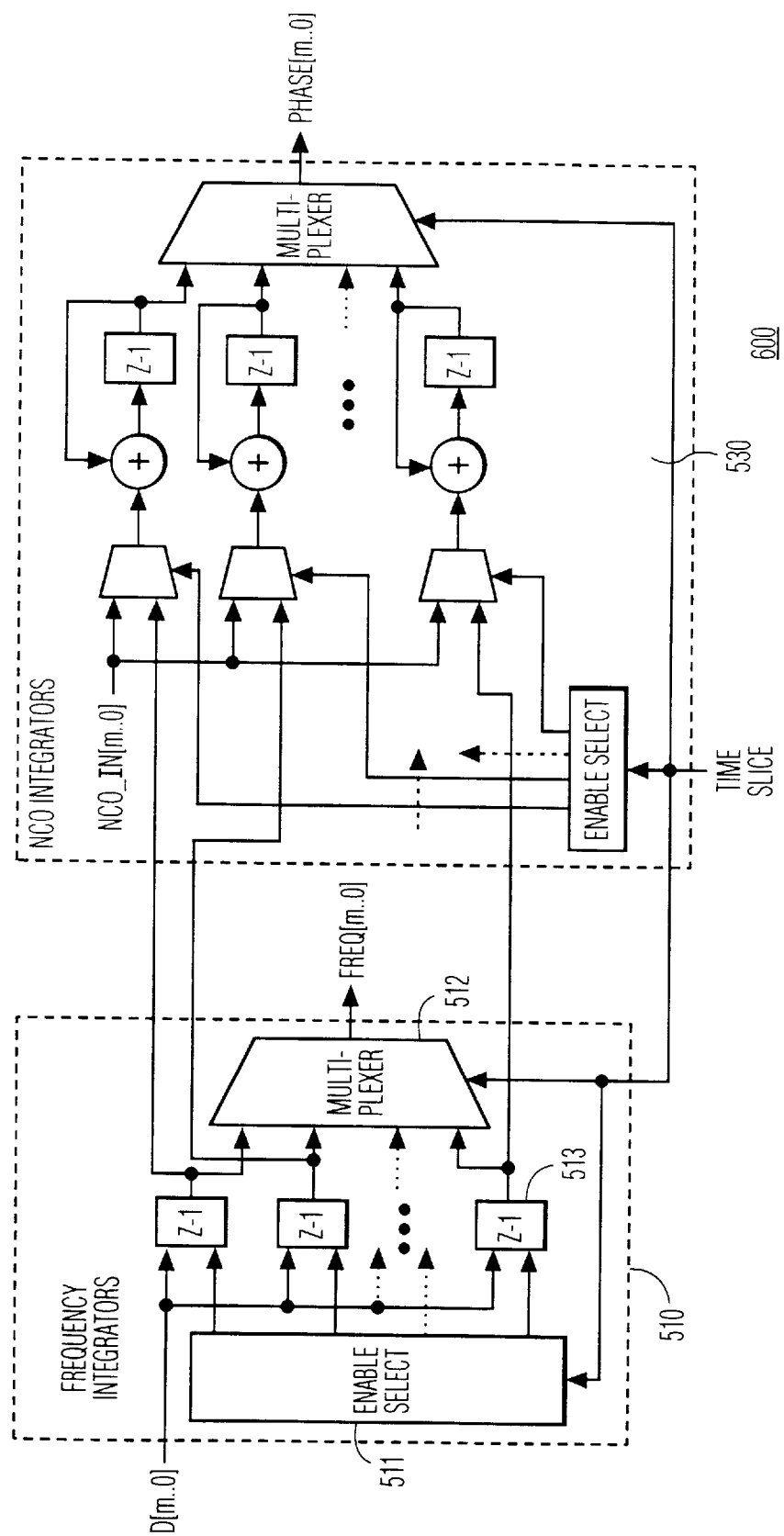
FIG. 6 is a block diagram showing the frequency and numerically controlled oscillator (NCO) integrators of the CTL block of FIG. 5 in further detail.

Referring now to FIG. 6, there is shown an embodiment 600 of the frequency and NCO integrators 510, 630 of CTL block 500 in further detail. Frequency accumulator 510 and NCO section 530 of CTL block 500 are implemented, in one embodiment, as illustrated. Frequency accumulator 510 is implemented with enable select 511 and multiplexer 512, similar to the AGC accumulator 300 of FIG. 3. In the embodiment 600 illustrated in FIG. 6, NCO integrator 530 is either updated or computed as a function of the delay between time slices. The updates to NCO 530 require input from the frequency integrator 513 values. Separate accumulators are used for each time slice (i.e., for each transmitter-receiver pair). In one embodiment, the frequency integrator value stored in registers 513 is accumulated in NCO 530 when the path is not active (when a different transmitter-receiver pair is in use), and the frequency integrator and NCO for a given time slice are controlled in a closed loop during that time slice. As in the AGC case described above, this preserves the state of the loop for each link, minimizing the reacquisition time between TDMA packets.

Figure 7:
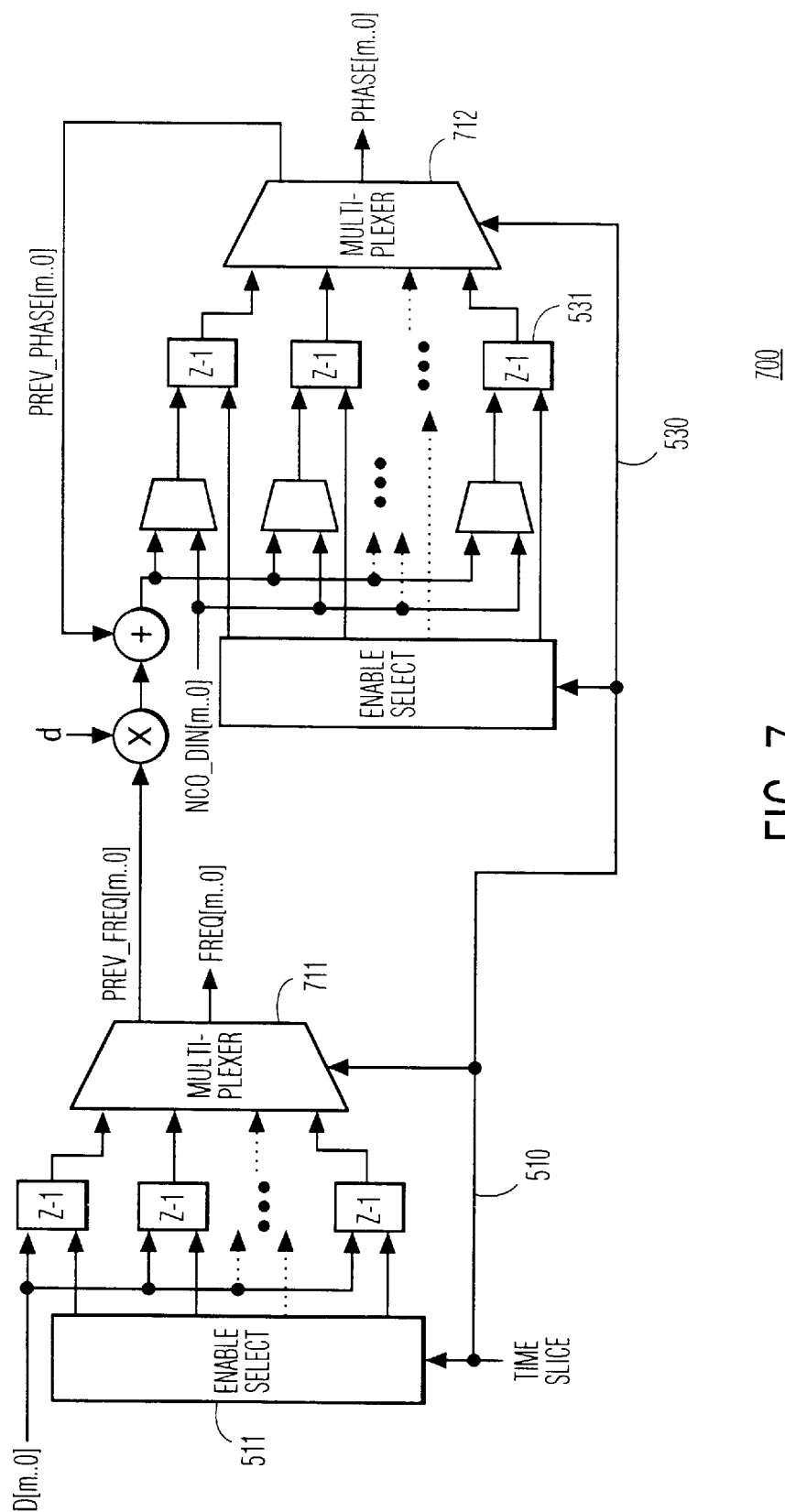
FIG. 7 is a block diagram showing an alternative embodiment of the frequency and NCO integrators of the CTL block of FIG. 5 in further detail.

Referring now to FIG. 7, there is shown an embodiment 700 of an alternative embodiment of the frequency and NCO integrators 510, 630 of CTL block 500 in further detail. In embodiment 700, the NCO integrator is computed instantaneously instead of continuously. In this case, the multiplication is computed once per time slice, not every sample as in the accumulators used in embodiment 600 of FIG. 6. Multiplexers 711, 712 allow the NCO registers 531 to be programmed with the current NCO value plus the product of delay until the next packet for this link, times the current frequency value (i.e., executing Eq.). This is equivalent to accumulating the current frequency value until the next active time for this link (the next time slice). In systems with digital enabled timing, d in equation is based on enabled samples computed by the timing system. The enabled timing system may be a digital timing recovery system deriving timing from signal characteristics, or an enabled timing system relying on a master NCO synchronized by timing data sent over the channel.

The state of an equalization block is typically represented by a plurality of parameters known as a set of coefficients. In one embodiment, such an equalization block is employed, such as a least mean squares (LMS) equalizer. Because each handset communicates over the shared RF channel via its time-divided link or time slice, and the RF path for each handset is different, the equalization block of the present invention stores a unique set of equalization coefficients for each handset or link. In one embodiment, these values are stored in a plurality of coefficient accumulators, and are swapped out for each time slice. In an alternative embodiment, a transposed filter structure is employed in which each coefficient is swapped out as the summation shifts out of the adder pipeline. One skilled in the art will recognize how to implement an equalization block so that its parameters may be changed as describe above, in accordance with the present invention.

Figure 8:
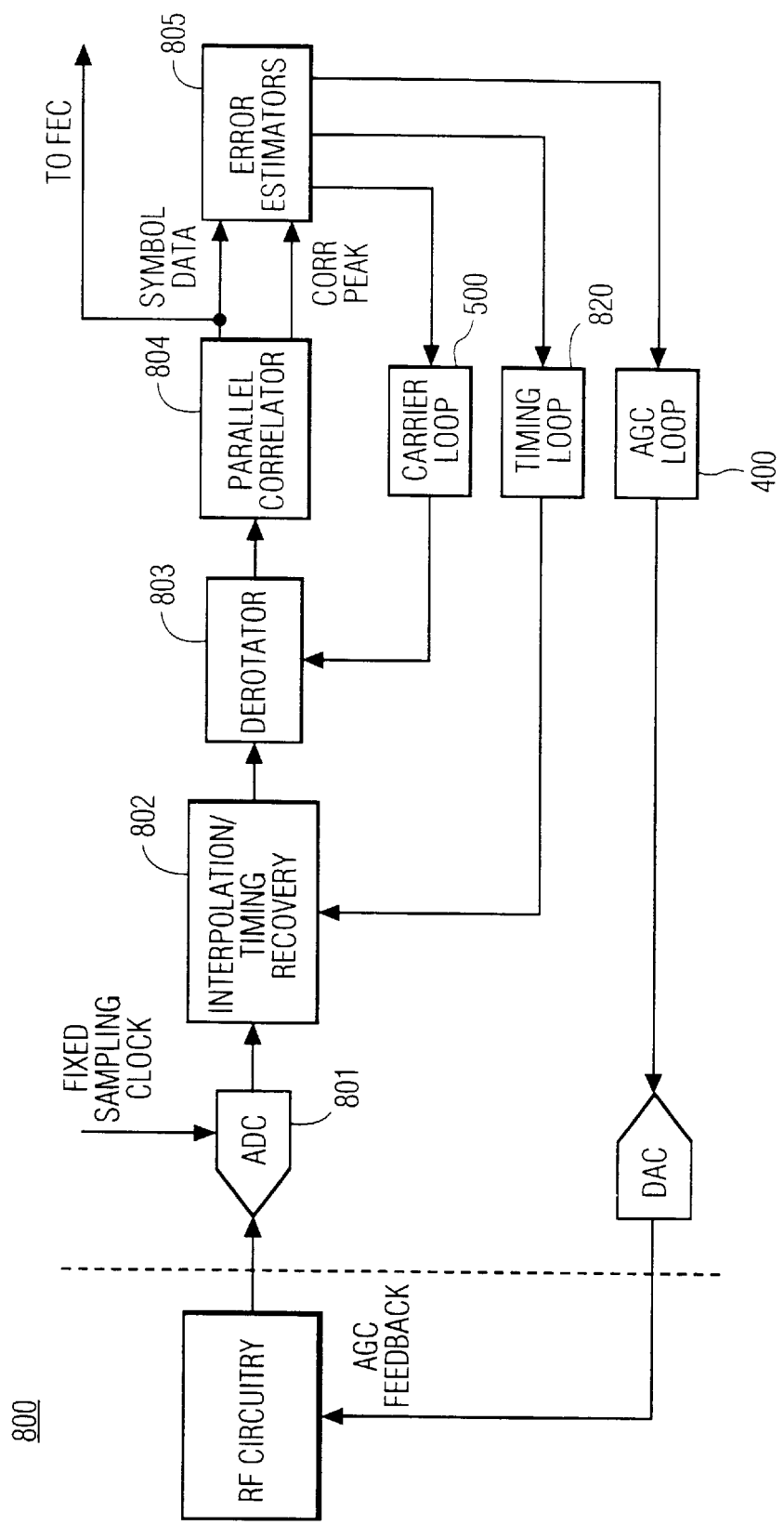
FIG. 8 is a flow diagram of an exemplary signal processing flow for the receiver portion of the base unit of FIG. 1, in accordance with an embodiment of the present invention.

Referring now to FIG. 8, there is shown a flow diagram of an exemplary signal processing flow 800 for the receiver portion of base unit 110, in accordance with an embodiment of the present invention. A near baseband signal is sampled using a fixed clock, applied to ADC 801. This signal is applied to an interpolation/timing recovery mechanism 802 which derives its error from the data past parallel correlator 804. A derotator 803 follows the timing estimator. Derotator 803 presents a phase corrected signal to parallel correlator 804, as will be appreciated. The symbol stream at the output of parallel correlator 804 is applied to a FEC system (not shown). The detection of the correlation peak will be dependent on the incoming SNR (signal-to-noise ratio), signal level, carrier and timing offset. Carrier or CTL loop or block 500, timing loop or block 820, and AGC loop or block 400 are implemented in the signal flow as illustrated. Timing loop 820 is used to establish sampling synchronization at a receiver, so that sampling occurs at the proper time. In an alternative embodiment, timing loop 820 is characterized by timing loop parameters, which are included in the set of demodulation parameters stored and adjusted for each handset.

The illustrated signal flow is based on the assumption that base station 110 is the master and controls timing, carrier, and power levels. The handsets 120, based on this assumption, lock to the base's reference clock and carrier frequency and additionally provide information back to the base regarding their status. This assists base 110 in keeping track of all active and idle-mode links in the system. This strategy is aimed at maintaining robust links and also minimizing the time taken for a system to synchronize after either a cold start or from the idle mode. The processing at the base and processing at the handset may thus be regarded separately, to distinguish between the two functional operations. It is clear that the handset functions are a subset of the processing at the base.

As will be appreciated, in alternative embodiments, the present invention may be implemented in other types of multiple-access systems, such as TDMA, CDMA, and FDMA, where there is a need to frequently access multiple channels. In such alternative embodiments, the present invention provides for preserving the state of the relevant demodulation parameters, for each separate link, so as to minimize acquisition requirements. In CDMA and FDMA systems, symbol timing for the channels may be independent, allowing symbol or chip timing loops to operate in a manner similar to the CIL described in this document.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A wireless telephone system, comprising:
    (a) a base transceiver having a base receiver; and
    (b) a plurality of wireless handsets, each handset comprising a handset transceiver for establishing a wireless link over a shared channel with the base unit via the base transceiver, the base receiver comprising synchronization means comprising an automatic gain control (AGC) loop, a carrier tracking loop (CTL), and an equalization loop, characterized in that the synchronization means is for synchronizing with each handset, in accordance with a set of demodulation parameters for said each handset, wherein each set of demodulation parameters comprises an AGC state parameter for determining the state of the AGC loop, a CTL frequency parameter and a CTL NCO parameter for determining the state of the CTL loop, and a set of equalization coefficients for determining the state of the equalization loop, characterized in that the synchronization means stores a set of demodulation parameters for each handset in accordance with the demodulation parameters utilized for the most recent time slot for the handset and switches to a stored set of demodulation parameters for a particular handset when the base unit is to synchronize with the particular handset.

2. The system of claim 1, wherein the wireless link is a time-division multiple access (TDMA) link, in which each handset communicates during an exclusive time slot of a TDMA scheme that allocates time slots to handsets.

3. The system of claim 1, wherein the set of demodulation parameters stored for each handset is updated for each time slot for the handset.

4. The system of claim 1, wherein the base unit is coupleable to one or more external telephone lines.

5. The system of claim 1, wherein a plurality of adaptive differential pulse code modulation (ADPCM) data samples are transmitted during each time slot.

6. The system of claim 1, wherein:
    the the AGC loop comprises an AGC integrator having a plurality of registers for storing an AGC state parameter for each handset; and
    the CTL loop comprises a CTL frequency integrator having a plurality of registers for storing a CTL frequency parameter for each handset and a CTL NCO integrator for storing a CTL NCO parameter for each handset.

7. The system of claim 6, further comprising enable select units and multiplexers coupled to the pluralities of registers for the AGC state parameters, the CTL frequency parameters, and the CTL NCO parameters for selecting the corresponding demodulation parameters for a handset during a time slot for the handset.

8. In a wireless telephone system having a base unit and a plurality of wireless handsets, the base unit comprising a base transceiver having a base receiver, a method for establishing, for each handset, a wireless link over a shared RF channel with the base unit transceiver, characterized in that the method comprises the steps of:
    (a) synchronizing, with an automatic gain control (AGC) loop, a carrier tracking loop (CTL), and an equalization loop of the base receiver, at the beginning of time slots for each handset, with the handset in accordance with a set of demodulation parameters for the handset, wherein each set of demodulation parameters comprises an AGC state parameter for determining the state of the AGC loop, a CTL frequency parameter and a CTL NCO parameter for determining the state of the CTL loop, and a set of equalization coefficients for determining the state of the equalization loop;
    (b) storing a set of demodulation parameters for each handset in accordance with the demodulation parameters utilized for the most recent time slot for the handset; and (c) switching, during synchronization, to the stored set of demodulation parameters for a particular handset when the base unit is to synchronize with the particular handset.

9. The method of claim 8, wherein the wireless link is a TDMA link, in which each handset communicates during an exclusive time slot of a TDMA scheme that allocates time slots to handsets.

10. A base unit for communicating with a plurality of wireless handsets, comprising:

(a) a base transceiver having a base receiver and a base transmitter for establishing a wireless link over a shared channel with the handsets;

(b) synchronization means comprising an automatic gain control (AGC) loop, a carrier tracking loop (CTL), and an equalization loop, characterized in that the synchronization means is for synchronizing with each handset in accordance with a set of demodulation parameters for said each handset, wherein each set of demodulation parameters comprises an AGC state parameter for determining the state of the AGC loop, a CTL frequency parameter and a CTL NCO parameter for determining the state of the CTL loop, and a set of equalization coefficients for determining the state of the equalization loop; and (c) means for storing a set of demodulation parameters for each handset in accordance with the demodulation parameters utilized for the most recent time slot for the handset and for switching the synchronization means to the set of demodulation parameters for a particular handset when the base unit is to synchronize with the particular handset.

11. The base unit of claim 10, wherein the wireless link is a TDMA link, in which each handset communicates during an exclusive time slot of a TDMA scheme that allocates time slots to handsets.

* * * * *